United States Patent
Harris et al.

(10) Patent No.: US 11,332,095 B2
(45) Date of Patent: May 17, 2022

(54) AIRBAG CHUTE PANEL AND METHOD OF MANUFACTURING THE SAME

(71) Applicant: INOAC USA, Inc., Troy, MI (US)

(72) Inventors: Bradley W. Harris, South Lyon, MI (US); Michael J. Aittama, Fenton, MI (US)

(73) Assignee: INOAC USA, Inc., Troy, MI (US)

( * ) Notice: Subject to any disclaimer, the term of this patent is extended or adjusted under 35 U.S.C. 154(b) by 0 days.

(21) Appl. No.: 17/116,281

(22) Filed: Dec. 9, 2020

(65) Prior Publication Data

US 2021/0221319 A1  Jul. 22, 2021

Related U.S. Application Data

(60) Provisional application No. 62/964,362, filed on Jan. 22, 2020.

(51) Int. Cl.
*B60R 21/215* (2011.01)
*B29C 45/14* (2006.01)
(Continued)

(52) U.S. Cl.
CPC ...... *B60R 21/215* (2013.01); *B29C 45/14336* (2013.01); *B32B 5/18* (2013.01); *B32B 27/065* (2013.01); *B32B 27/32* (2013.01); *B29K 2023/00* (2013.01); *B29L 2031/3038* (2013.01); *B32B 7/12* (2013.01); *B32B 2250/02* (2013.01); *B32B 2250/24* (2013.01);
(Continued)

(58) Field of Classification Search
CPC ....... B60R 25/08; B60R 21/235; B60R 21/20; B60R 21/2165; B60R 21/2176; B60R 21/2172; B32B 2605/003; B29L 2031/3041; B29L 2031/3005; B29C 39/10; B29C 45/14; B29C 45/26
See application file for complete search history.

(56) References Cited

U.S. PATENT DOCUMENTS 5,868,419 A * 2/1999 Taguchi .............. B60R 21/2165
280/728.3
6,601,870 B2 * 8/2003 Suzuki ................ B60R 21/2165
280/728.2
(Continued)

FOREIGN PATENT DOCUMENTS

JP 2010069854 A 4/2010
KR 100828817 B1 5/2008

OTHER PUBLICATIONS

Written Opinion & International Search Report for PCT/EP2021/014378 dated Apr. 9, 2021, 11 pages.

Primary Examiner — Paul N Dickson
Assistant Examiner — Tiffany L Webb
(74) Attorney, Agent, or Firm — Reising Ethington P.C.

(57) ABSTRACT

A method of manufacturing a chute panel of an airbag assembly. The method comprises forming a substrate from a first material to have a body having first and second ends and a longitudinal axis extending therebetween and a void residing in the body. The method further comprises forming a chute and a chute door from a second material. The chute comprises a base molded onto the substrate body and one or more sidewalls extending from the base. And wherein forming the chute door comprises filling the void in the substrate body with the second material to form the chute door.

20 Claims, 9 Drawing Sheets

(51) Int. Cl.
  *B32B 27/06* (2006.01)
  *B60R 21/205* (2011.01)
  *B29L 31/30* (2006.01)
  *B29K 23/00* (2006.01)
  *B60R 21/16* (2006.01)
  *B32B 5/18* (2006.01)
  *B32B 27/32* (2006.01)
  *B32B 7/12* (2006.01)

(52) U.S. Cl.
  CPC ....... *B32B 2605/003* (2013.01); *B60R 21/205* (2013.01); *B60R 2021/161* (2013.01)

(56) References Cited

U.S. PATENT DOCUMENTS

| | | | |
|---|---|---|---|
| 8,336,908 B1 | 12/2012 | Kalisz et al. | |
| 8,469,393 B1 * | 6/2013 | Siewert | B29C 44/351 280/728.3 |
| 8,474,861 B1 * | 7/2013 | Twork | B60R 21/215 280/728.3 |
| 9,975,517 B2 | 5/2018 | Shick et al. | |
| 10,093,267 B2 * | 10/2018 | Kong | B60R 21/055 |
| 2008/0136146 A1 | 6/2008 | Kong | |
| 2017/0066401 A1 | 3/2017 | Cowelchuk et al. | |

* cited by examiner

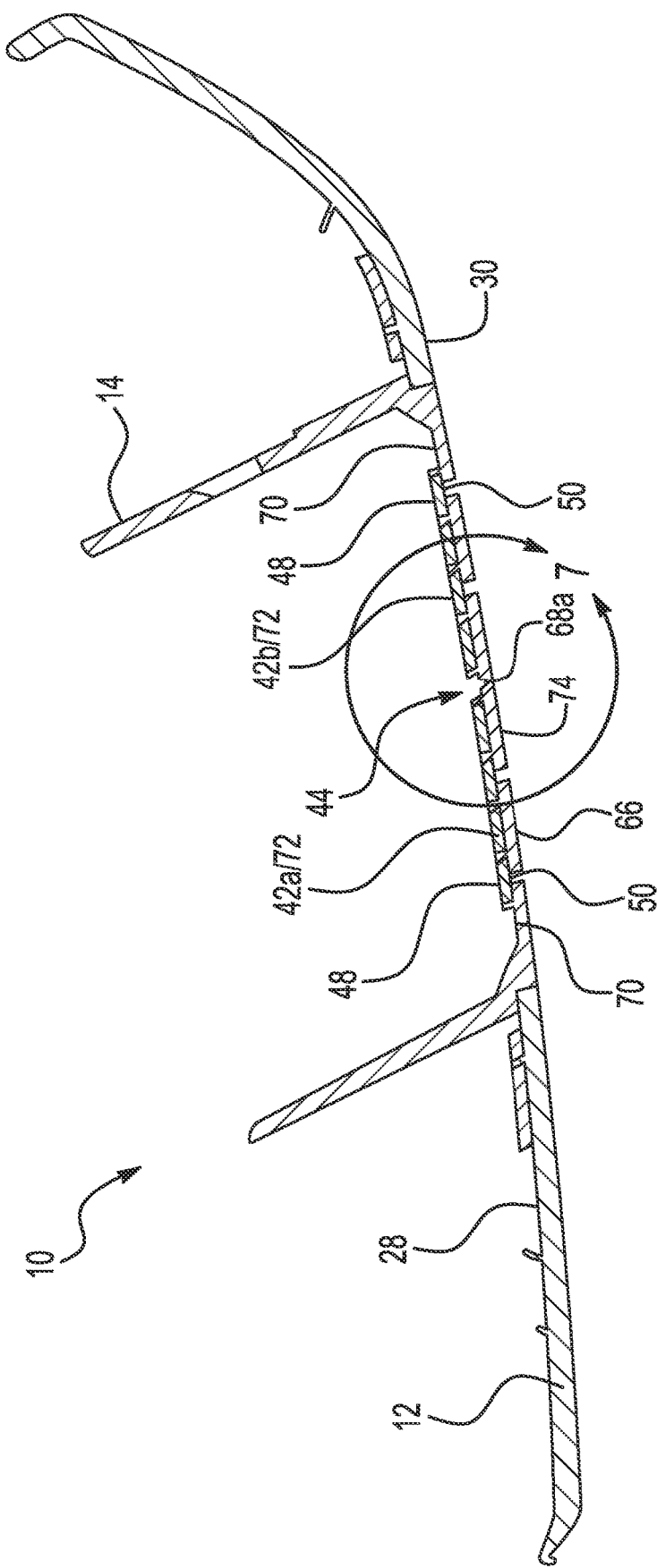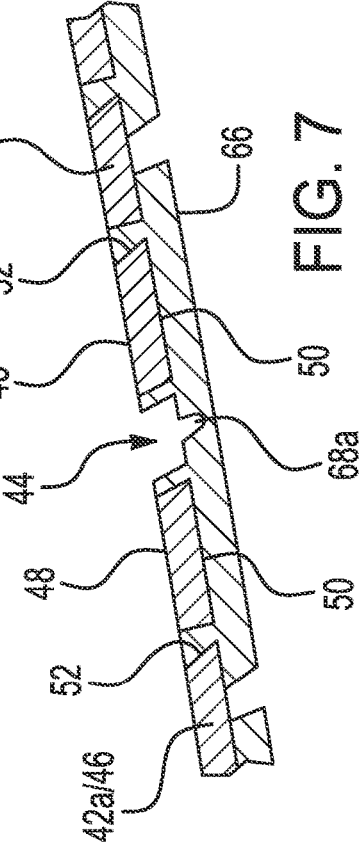

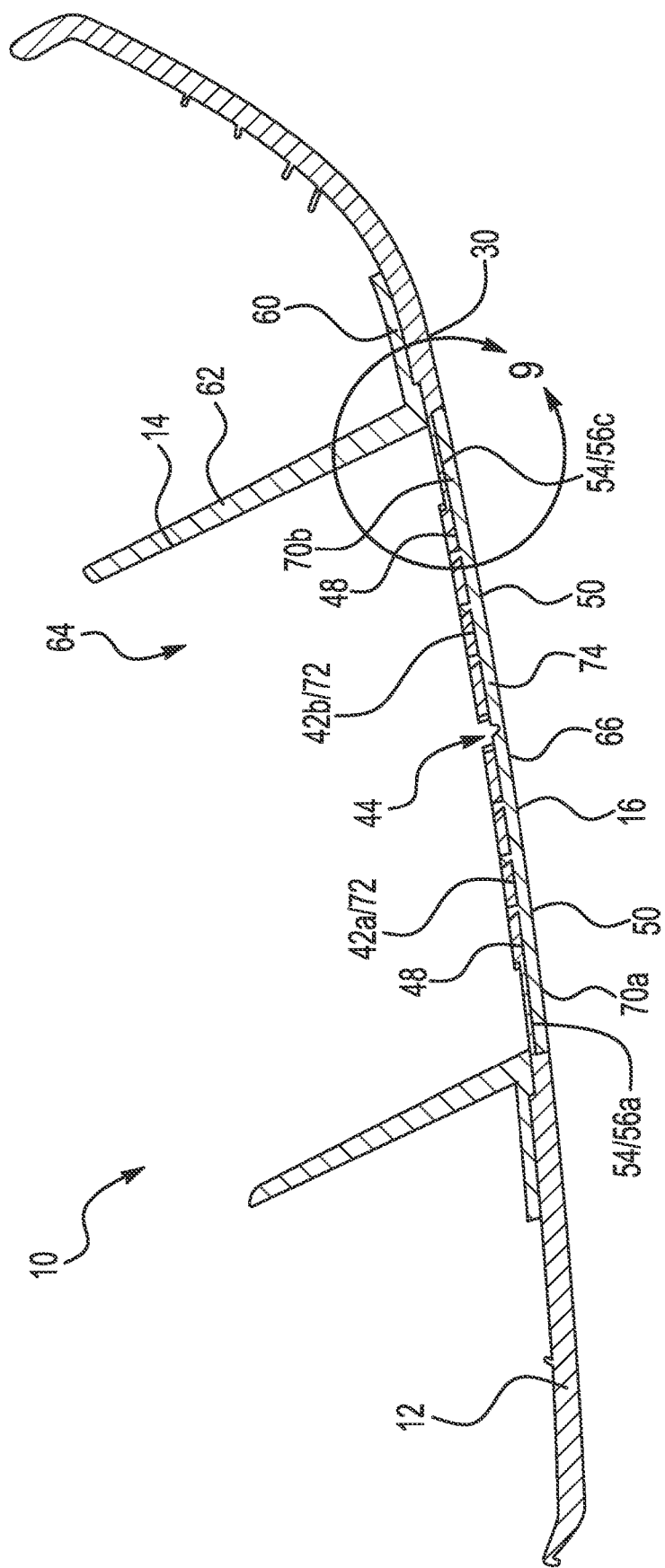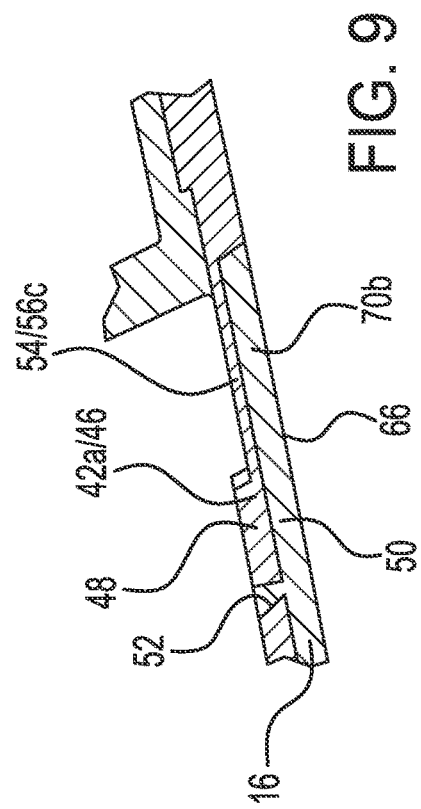

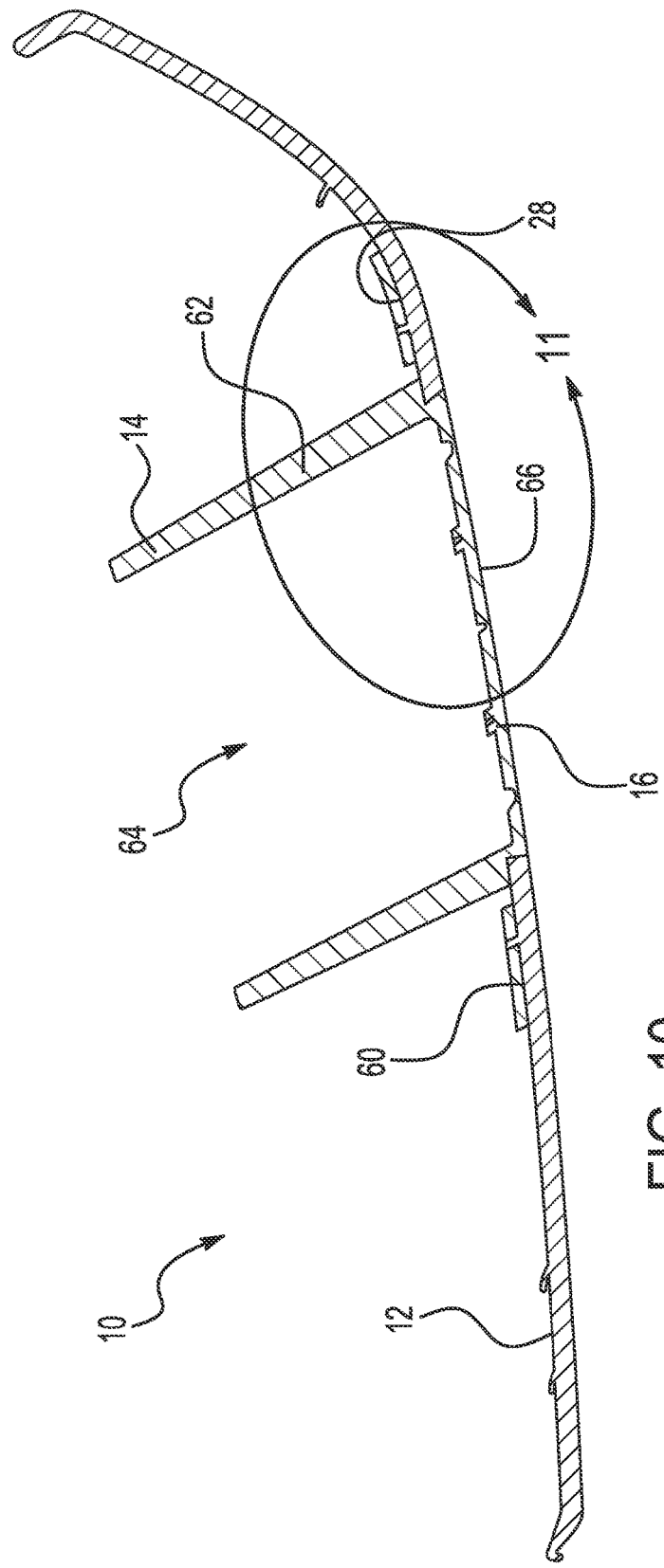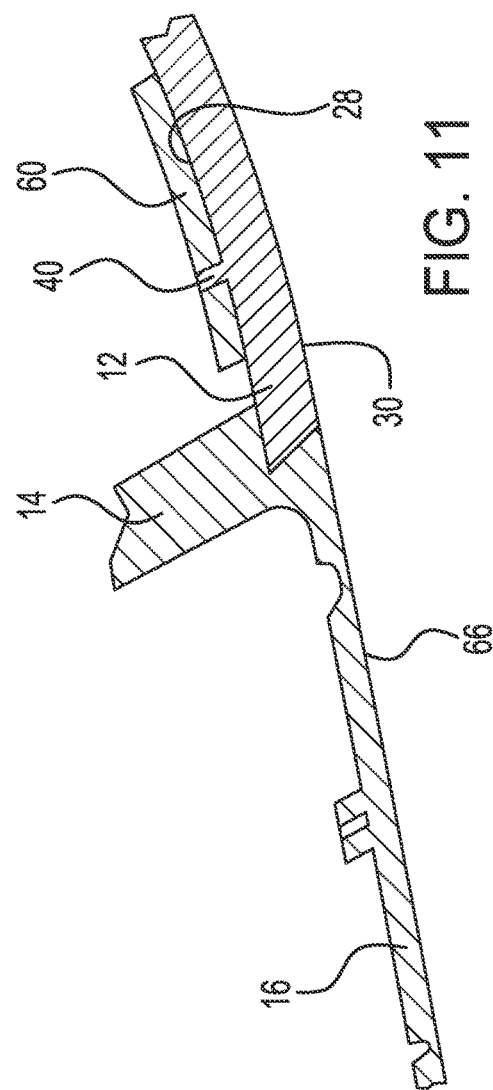

AIRBAG CHUTE PANEL AND METHOD OF MANUFACTURING THE SAME

CROSS REFERENCE TO RELATED APPLICATIONS

This application claims the benefit of U.S. Provisional Application No. 62/964,362 filed Jan. 22, 2020, the entire contents of which are hereby incorporated by reference.

TECHNICAL FIELD

This disclosure relates generally to vehicular airbag assemblies, and more particularly, to an airbag chute panel of a passenger airbag assembly and a method of manufacturing the same.

BACKGROUND

Passenger airbag assemblies are typically provided in the dashboard of a vehicle and are positioned in front of the passenger seat. Such an assembly generally includes a chute panel that forms part of an instrument panel of the vehicle, and a cannister that houses an airbag in a deflated or folded state. The chute panel may include a substrate, a chute, and a chute door, and when the airbag assembly is assembled, the airbag cannister is disposed within and secured to the chute. When the airbag is activated, the airbag inflates within the chute causing the chute door to rupture allowing the airbag to be blown out from the chute and the dashboard and into the cabin of the vehicle toward the passenger seat.

As described above, a chute panel of a passenger airbag assembly generally includes a substrate and a chute that is configured to house an airbag cannister. A conventional way of manufacturing such a chute panel includes forming the substrate and chute as two separate parts or components and then coupling them together using, for example, a welding process such as vibration welding, hot plate welding, or laser welding. This manufacturing process is not without its drawbacks, however.

For example, since the panel is constructed of two separate parts that have to be welded together, the panel is relatively heavy. Additionally, the required welding process results in a rather long manufacturing time, causes portions of the two components to melt, and requires the use of expensive equipment to perform the welding process.

Accordingly, there is a need for a passenger airbag chute panel and a method of manufacturing the same that minimizes and/or eliminates one or more of the above-identified deficiencies in conventional chute panels and chute panel manufacturing processes.

SUMMARY

In at least some implementations, a method of manufacturing a chute panel of an airbag assembly comprises forming a substrate from a first material wherein the substrate includes a body having a first end, a second end, and a longitudinal axis extending between the first and second ends, and a void residing in the body. The method further comprises forming a chute and a chute door from a second material, wherein a portion of the chute is molded onto the body of the substrate, and forming the chute door comprises filling in the void in the body of the substrate with the second material to form the chute door.

In at least some implementations, a chute panel for an airbag assembly comprises a substrate including a body having a first end, a second end opposite the first end, and a longitudinal axis extending therebetween, and a void residing in the body. The panel further includes a chute molded onto the substrate body and at least partially surrounding the void of the substrate, and a chute door formed in the void of the substrate.

In at least some implementations, a chute panel for an airbag assembly comprises a substrate including a body having a first end, a second end, and a longitudinal axis extending therebetween, a void residing in the body, and at least one chute door support structure connected to the body of the substrate and extending across at least a portion of the void of the substrate. The panel further includes a chute molded onto the substrate body and at least partially surrounding the void of the substrate, and a chute door formed in the void of the substrate. The chute door includes a first portion and second portion, wherein the first portion comprises the at least one chute door support structure and the second portion is molded onto the first portion.

Further aspects or areas of applicability of the present disclosure will become apparent from the detailed description, claims and drawings provided hereinafter. It should be understood that the summary and detailed description, including the disclosed embodiments and drawings, are merely illustrative in nature intended for purposes of illustration only and are not intended to limit the scope of the invention, its application or use. Thus, variations that do not depart from the gist of the disclosure are intended to be within the scope of the invention.

BRIEF DESCRIPTION OF DRAWINGS

One or more aspects of the disclosure will hereinafter be described in conjunction with the appended drawings, wherein like designations denote like elements, and wherein:

FIG. 6 is a cross-section view of the chute panel illustrated in FIG. 5 taken along the line 6-6 in FIG. 5;

FIG. 7 is an enlarged view of a portion of the cross-sectional view of the chute panel shown in FIG. 6;

FIG. 8 is another cross-section view of the chute panel illustrated in FIG. 5 taken along the line 8-8 in FIG. 5;

FIG. 9 is an enlarged view of a portion of the cross-sectional view of the chute panel shown in FIG. 8;

FIG. 10 is another cross-section view of the chute panel illustrated in FIG. 5 taken along the line 10-10 in FIG. 5;

FIG. 11 is an enlarged view of a portion of the cross-sectional view of the chute panel shown in FIG. 10;

DETAILED DESCRIPTION

Figure 1:
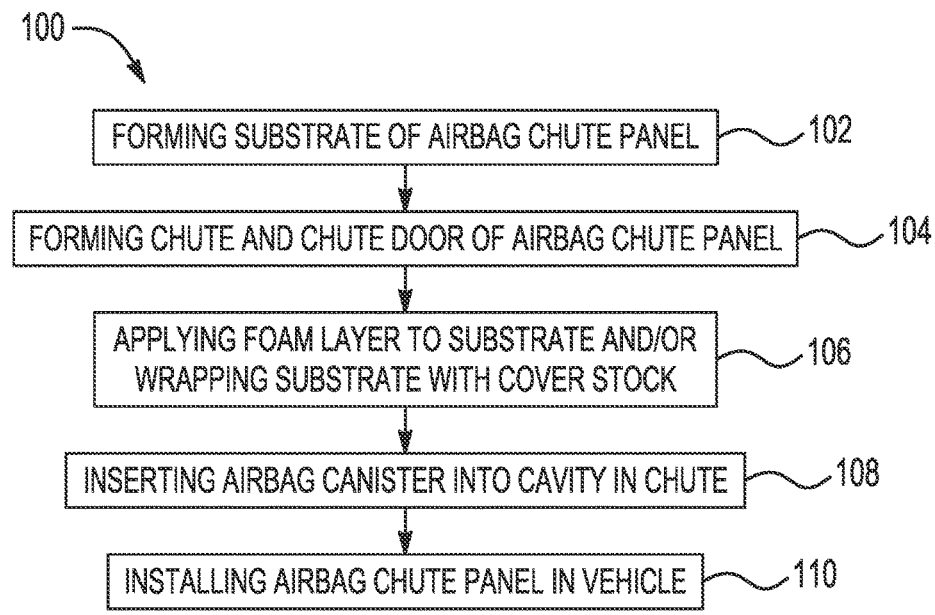
FIG. 1 is a flowchart of an illustrative embodiment of a method of manufacturing a chute panel of an airbag assembly.
Figure 2:
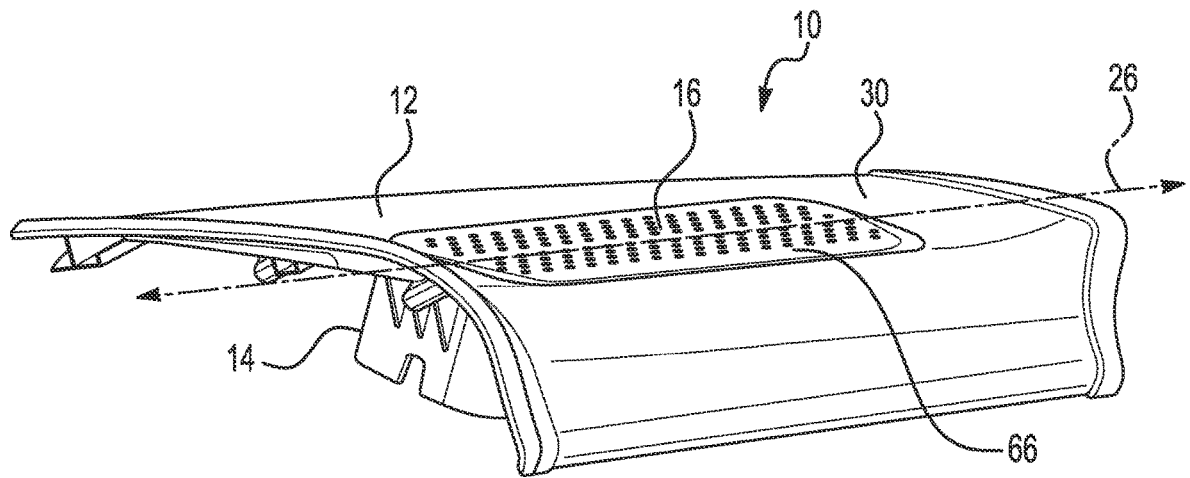
FIG. 2 is a perspective view of an illustrative embodiment of a chute panel of an airbag assembly.
Figure 3:
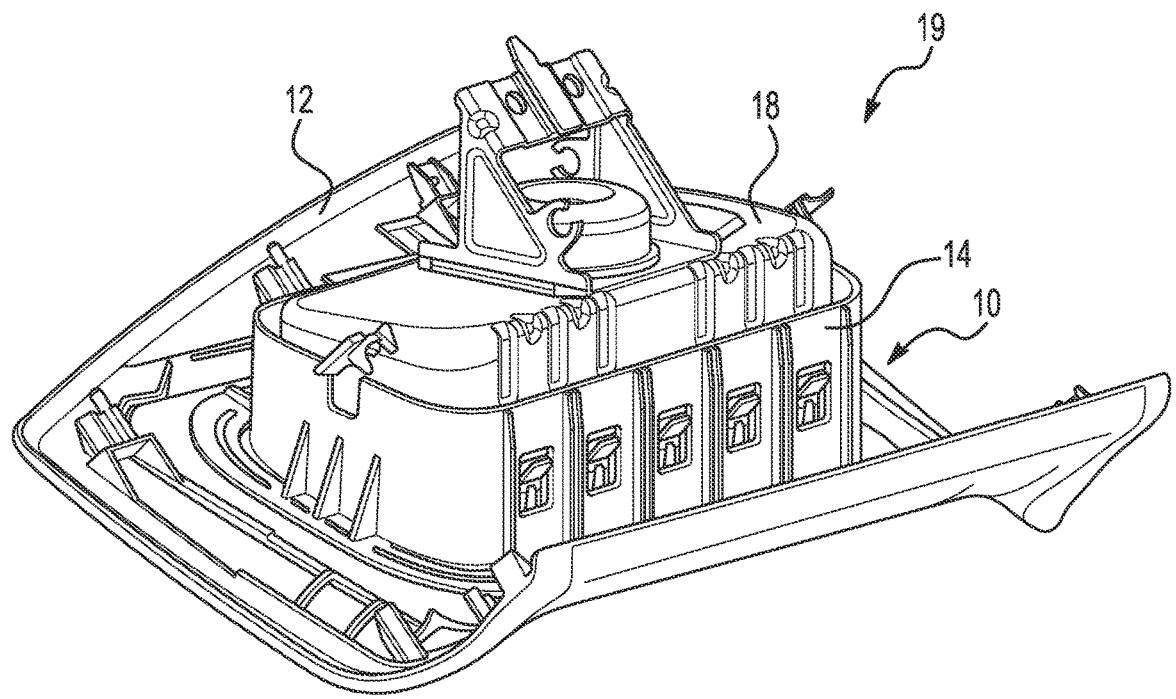
FIG. 3 is a perspective view of an illustrative embodiment of an airbag assembly comprising the chute panel illustrated in FIG. 2.

Referring in more detail to the drawings, FIG. 1 depicts an illustrative embodiment of a method 100 of manufacturing a passenger airbag chute panel of a vehicular airbag assembly, and FIGS. 2 and 3 depict an illustrative embodiment of a passenger airbag chute panel 10 that may be manufactured using the method 100 illustrated in FIG. 1. As will be described in greater detail below, the chute panel 10 comprises, at least in part, a substrate 12, a chute 14, and a chute door 16. As shown in FIG. 3, the chute 14 is sized and configured to receive and house an airbag cannister 18 of a vehicle airbag assembly 19.

For purposes of illustration and clarity only, method 100 will be primarily described in the context of the chute panel 10 briefly described above and illustrated in, for example, FIGS. 2 and 3. It will be appreciated, however, that the application of the present methodology is not meant to be limited solely to such an embodiment of a chute panel. Rather, method 100 may find application with any number of chute panel embodiments or designs that differ in one or more respects from the chute panel 10 described herein. Additionally, it will be appreciated that unless otherwise noted, the performance of method 100 is not meant to be limited to any one particular order or sequence of steps.

In at least some embodiments, method 100 includes a step 102 of forming the substrate 12 of the chute panel 10. In an embodiment wherein method 100 includes such a step, step 102 may comprise forming the substrate 12 using a known molding process, for example, an injection molding process. More specifically, step 102 may comprise introducing an appropriate amount of molding material into a suitable mold and holding the material therein for a predetermined amount of time. The molding material is then cooled and the resulting substrate is removed from the mold. A number of different types of molding material may be used in step 102 to form the substrate 12, including for example and without limitation, thermoplastic olefin (TPO) or a compound comprised of TPO and talc. It will be appreciated, however, that while particular examples of molding materials have been provided, any number of suitable materials may be used, and thus, the present disclosure is not intended to be limited to any particular material(s).

The particular form or design of the substrate 12 formed in step 102 will depend, at least in part, on the particular mold used in its formation. In the embodiment illustrated in, for example, FIG. 4, the forming step 102 comprises forming the substrate 12 to have a body 20 having a first end 22, a second end 24 opposite the first end 22, and a longitudinal axis 26 extending through and between the first and second ends 22, 24. The body 20 further includes a first surface 28 facing in a radial direction relative to the longitudinal axis 26, and a second surface 30 (best shown in FIG. 6) also facing in a radial direction relative to the axis 26 but in a direction that is away from the first surface 28 such that, in an embodiment, the first and second surfaces 28, 30 face in opposite directions.

In an embodiment, step 102 further comprises forming the substrate 12 to have a void or aperture 32 residing in the body 20 that extends through both the first and second surfaces 28, 30 of the body 20 such that the void 32 is a throughgoing void in the body 20. The void 32 may be defined by one or more internal or interior walls or surfaces 34 of the body 20 that face radially inwardly relative to the axis 26, and one or more other internal or interior walls or surfaces 35 that face axially inwardly relative to the axis 26. Additionally, a first end 36 of the void 32 may be defined by the first surface 28 and a second end 38 of the void 32 may be defined by the second surface 30. The void 32 may take any number of shapes and sizes. For example, in the embodiment illustrated in FIG. 4, the void 32 has a substantially rectangular shape and is sized to accommodate the airbag cannister 18 that is ultimately housed within the chute 14 of the chute panel 10. In other embodiments, however, the void 32 may have a different shape and/or size from that illustrated in FIG. 4.

Figure 4:
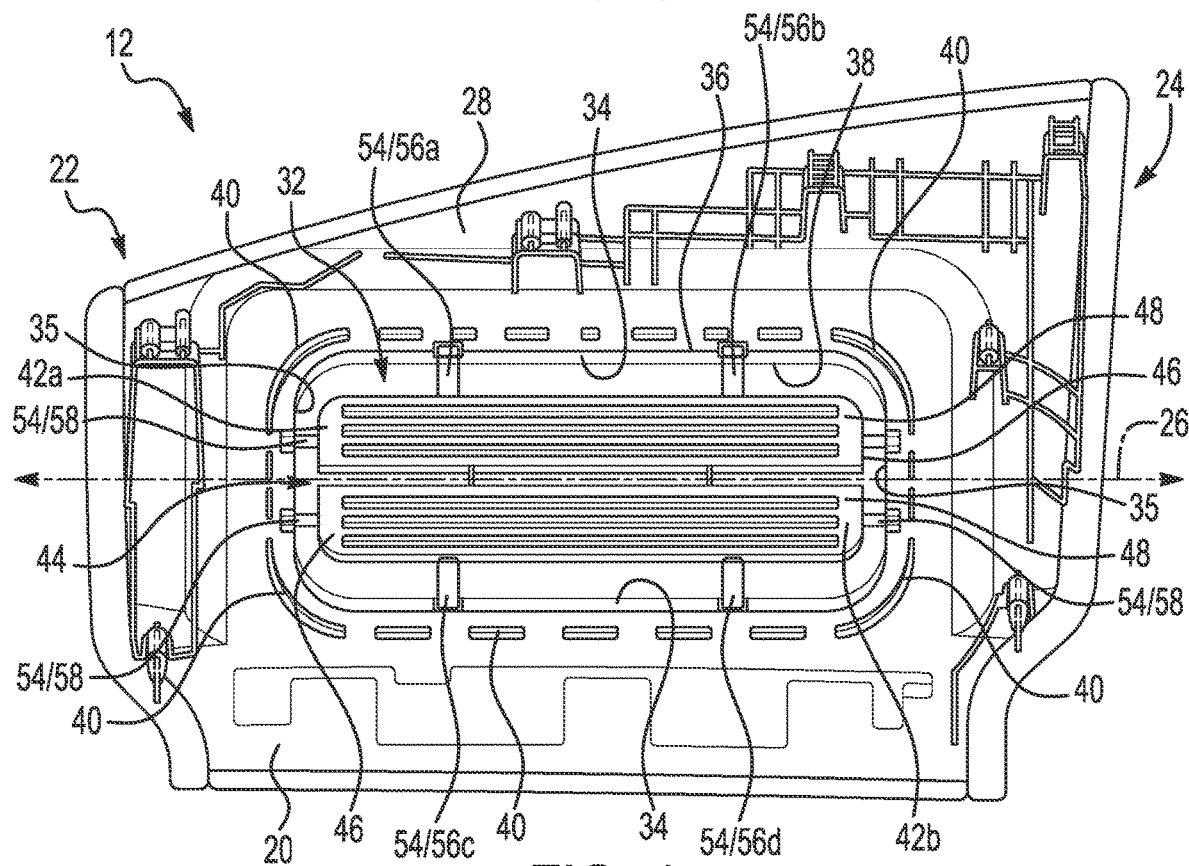
FIG. 4 is a plan view of an illustrative embodiment of a substrate of a chute panel such as that illustrated in FIG. 2.

In addition to the body 20 and the void 32 described above, in at least some embodiments, the substrate 12 may further include one or more projections 40 projecting radially from the body 20, and the first surface 28 thereof, in particular. At least some of the projection(s) 40, also referred to herein as interlock(s) 40, are located adjacent to the void 32 and are configured to provide additional surface area of the substrate 12 to which a material used in a later step to form the chute 14 of the chute panel 10 may be bonded. The interlock(s) 40 may have any number of sizes and shapes, and thus, the present disclosure is not intended to be limited to any particular size or shape. Further, the substrate 12 may include a single interlock 40 (e.g., an interlock that extends continuously about the perimeter of the void 32) or, as is illustrated in FIG. 4, a plurality of interlocks 40 that may be, for example, spaced apart from each other about the perimeter of the void 32. Accordingly, the present disclosure is not limited to any particular number or arrangement of interlocks 40. In any event, in an embodiment, step 102 comprises forming the substrate 12 to have one or more projections or interlocks 40 projecting from the body 20 of the substrate 12.

As shown in FIG. 4, in at least some embodiments, the substrate 12 may further include one or more structures or features 42 that comprise support or reinforcement structures for the chute door 16, and that, in an embodiment, form a portion or part of the chute door 16 after the performance of a later step of method 100 during which the chute 14 and chute door 16 of the chute panel 10 are formed. As such, the structures 42 may also be referred to herein as "door support structures" or "door supports." Among potentially other benefits, the structure(s) 42 add rigidity to the chute door and also ensure control over the burst path when the airbag inflates and the door ruptures to allow the airbag to fully deploy.

In some embodiments, the substrate 12 includes a single structure 42, while in other embodiments it may include plurality of structures 42. In either instance, each of the structures 42 is connected to or with the body 20 of the substrate 12 and extends from the body 20 across at least a portion of the substrate void 32 such that at least a portion of the structure 42 is suspended across at least a portion of the void 32. As will be described in greater detail below, the structure(s) 42 may be arranged and oriented with respect to the body 20 and, if applicable, other structure(s) 42, such that one or more burst seams may be formed adjacent to the structure(s) 42 (e.g., between the structure 42 and the body 20, between adjacent structures 42, etc.) during a later step of method 100 during which the chute 14 and chute door 16 are formed. Accordingly, the particular arrangement and orientation of the structure(s) 42 will, in at least some embodiments, depend at least in part on the particular type or style of burst seam to be used, for example and without limitation: a one door style, U-type burst seam; a two door style, H-type burst seam; a three door style, Y-type burst seam; or a four door style, bow tie-type burst seam. In the embodiment of substrate 12 illustrated in, for example, FIG. 4, the substrate 12 includes two structures 42 (structures 42*a* and 42*b*) having one or more gaps 44 therebetween. In an embodiment, the structures 42*a*, 42*b* may be connected together, while in other embodiments they are not.

Whether the substrate 12 includes one structure 42 or multiple structures 42, each of the structure(s) 42 has a body 46 having a first surface 48 facing in a radial direction relative to the longitudinal axis 26 of the substrate body 20, and a second surface 50 (best shown in FIG. 6) also facing in a radial direction relative to the axis 26 but in a direction that is away from the first surface 48 such that, in an embodiment, the first and second surfaces 48, 50 face in opposite directions. As will be described in greater detail below, and as best shown in FIGS. 6 and 7, the body 46 of the structure 42 may further include one or more channels or grooves 52 therein extending into the body 46 from one of the first and second surface 48, 50 to the other of the first and second surfaces 48, 50. In an embodiment, the channels 52 comprise throughgoing channels extending through both the first and second surfaces 48, 50 of the body 46; while in other embodiments, one or more of the channels 52 may not extend all the way through the body 46, but rather may extend only partially through the body 46. Further, the channels 52 may have any number of cross-sectional shapes. In one embodiment, at least one of the one or more channels 52 has a trapezoidal cross-sectional shape. It will be appreciated, however, that the channel(s) 52 may have other suitable cross-sectional shapes, and as such, the present disclosure is not intended to be limited to any particular shape(s). It will be further appreciated that the body 46 is not intended to be limited to any particular number of channels 52, but rather the body 46 may include any suitable number of channels 52.

As briefly described above, the structure(s) 42 are connected to or with the body 20 of the substrate 12. In an embodiment, the structure(s) 42 may be connected to one or more of the interior surface(s) or wall(s) 34 and/or one or more of the interior surface(s) or wall(s) 35 of the substrate body 20 that define(s) the void 32. In another embodiment, the structure(s) 42 may be connected to the first surface 28 or second surface 30 of the substrate body 20. Accordingly, it will be appreciated that the structure(s) 42 may be connected to any number of surfaces or portions of the substrate body 20, and thus, the present disclosure is not intended to be limited to the structure(s) 42 being connected to any particular surface or portion of the body 20. In any event, for purposes of this disclosure, the term "connect" or "connected" is intended to include instances where the structure(s) 42 and the body 20 are of a unitary or integral construction such that the structure(s) are integrally formed with the body 20 in step 102, as well as instances where the structures 42 and body 20 are separately formed and then coupled together by, for example, an adhesive or other fastening means, or using a connecting or coupling process, for example, a welding process.

The connection(s) between the structure(s) 42 and the body 20 may take a number of forms. In one embodiment, one or more of the structure(s) 42 may be cantilevered such that the structure 42 is connected to the substrate body 20 at one of its ends and protrudes outwardly therefrom. In other embodiments, one or more of the structures 42 may be connected to the body 20 at two or more connection points or locations. For example, in an embodiment such as that shown in FIG. 4, each structure 42 is connected to the body 20 at a number of connection locations 54 spaced apart about the body 46 of the structure 42. As shown in FIGS. 4, 8, and 9, in some embodiments, the structures 42 may be connected to the substrate body 20 by one or more hinge braces 56 (e.g., 56*a*-56*d*) that, as will be described below, form part of a chute door hinge after the performance of a later step of method 100 during which the chute 14 and chute door 16 of the chute panel 10 are formed. In such an instance, the hinge brace(s) 56 comprise at least one or more of the connection locations 54.

The structure(s) 42 may be additionally or alternatively connected to the substrate body 20 by one or more door burst releases 58 that are configured to break when the airbag inflates and the door 16 ruptures. In such an instance, the door burst release(s) 58 comprise at least one or more of the connection locations 54. In any event, the structure(s) 42 may be connected to the body 20 at any number of locations and in any number of suitable ways, and as such, the present disclosure is not intended to be limited to any particular location(s) and/or way(s).

As described above, one or more structure(s) 42 may extend across at least a portion of the void 32 that resides in the body 20. In one embodiment, one or more of the structure(s) 42 extends across the entirety of the void 32, while in other embodiments one or more of the structure(s) 42 extends across less than the entirety of the void 32. Further, in at least some embodiments, the entirety of one or more of the structures 42 is disposed within the void 32 (i.e., between the first and second ends 36, 38, of the void 32). In other embodiments, however, only a portion of one or more of the structures 38 is disposed within the void 32 (i.e., one or more portions of the structure 42 are not disposed between the first and second ends 36, 38 of the void 32), or no portion of one or more of the structures 42 is disposed within the void 32 (i.e., between the first and second ends 36, 38 of the void 32).

In any event, in an embodiment, step 102 comprises forming the substrate 12 to have one or more door supports or structures 42 connected to or with the body 20 of the substrate 12 that extend(s) from the body 20 and across at least a portion of the substrate void 32 such that at least a portion of one or more structure(s) 42 is/are suspended across at least a portion of the void 32.

In the embodiments described above, the substrate 12 includes the structures 42 and the structures 42 are connected to the body 20 of the substrate 12. In other embodiments, however, the structures 42 may not be part of the substrate 12 but rather may comprise one or more separate and distinct components of the panel 10. In such an embodiment, the structures 42 may comprise molded components that may be formed of the same type of material as the substrate 12 or may be formed of a different type of material. In an embodiment wherein the structures 42 are separate from the substrate 12, step 102 would comprise forming the substrate 12 and also forming the structures 42, and the same or different processes may be used to form the substrate 12 and structures 42.

Figure 15:
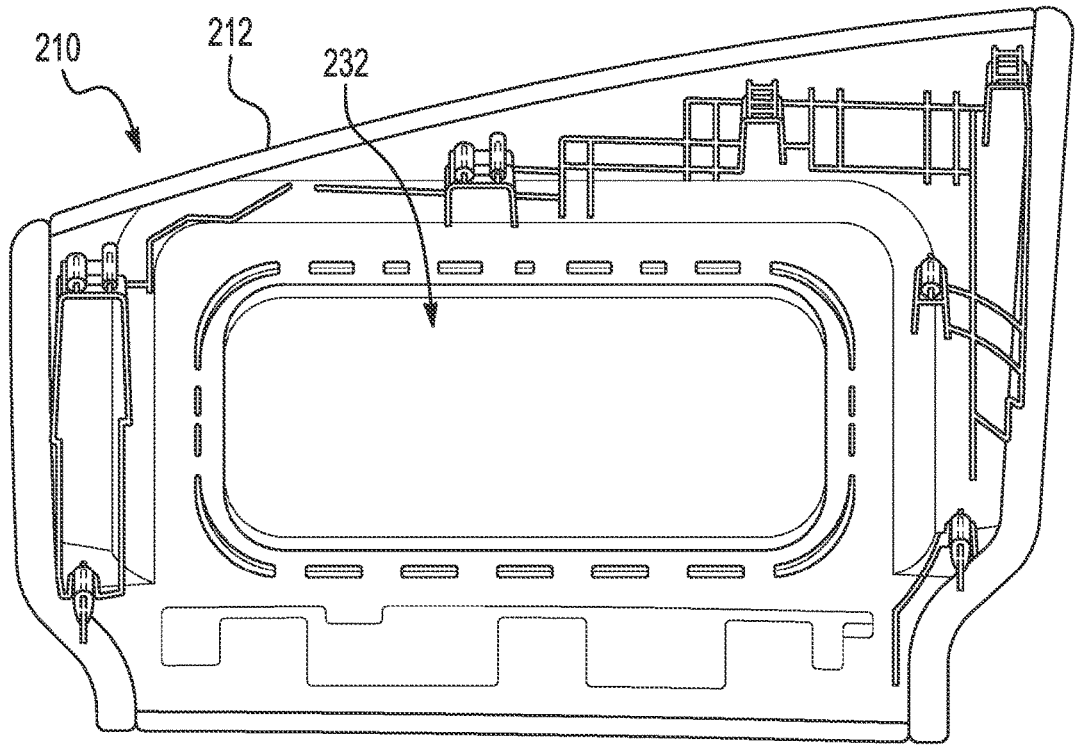
FIG. 15 is a plan view of another illustrative embodiment of a chute panel of an airbag assembly.

While in some embodiments, the substrate 12 includes one or more of the structures 42 described above, in other embodiments the substrate does not include any of door support structure(s) 42. In such embodiments, the substrate 12 thereof may not include any components within the substrate void 32. FIG. 15 illustrates one such embodiment wherein the chute panel 10 (chute panel 210 in FIG. 15) and substrate 12 (substrate 212 in FIG. 15) thereof do not have any door support structures disposed within the substrate void 32 (void 232 in FIG. 15). In this embodiment, with the exception of not having any door support structures, the chute panel 210 is the same as chute panel 10 described above, the description of which will not be repeated but rather is incorporated here by reference in its entirety. In any event, it will be appreciated that embodiments wherein the chute panel 10 and substrate 12 thereof, in particular, do not include any door support structures or other components within the substrate void remain within the spirit and scope of the present disclosure.

Figure 16:
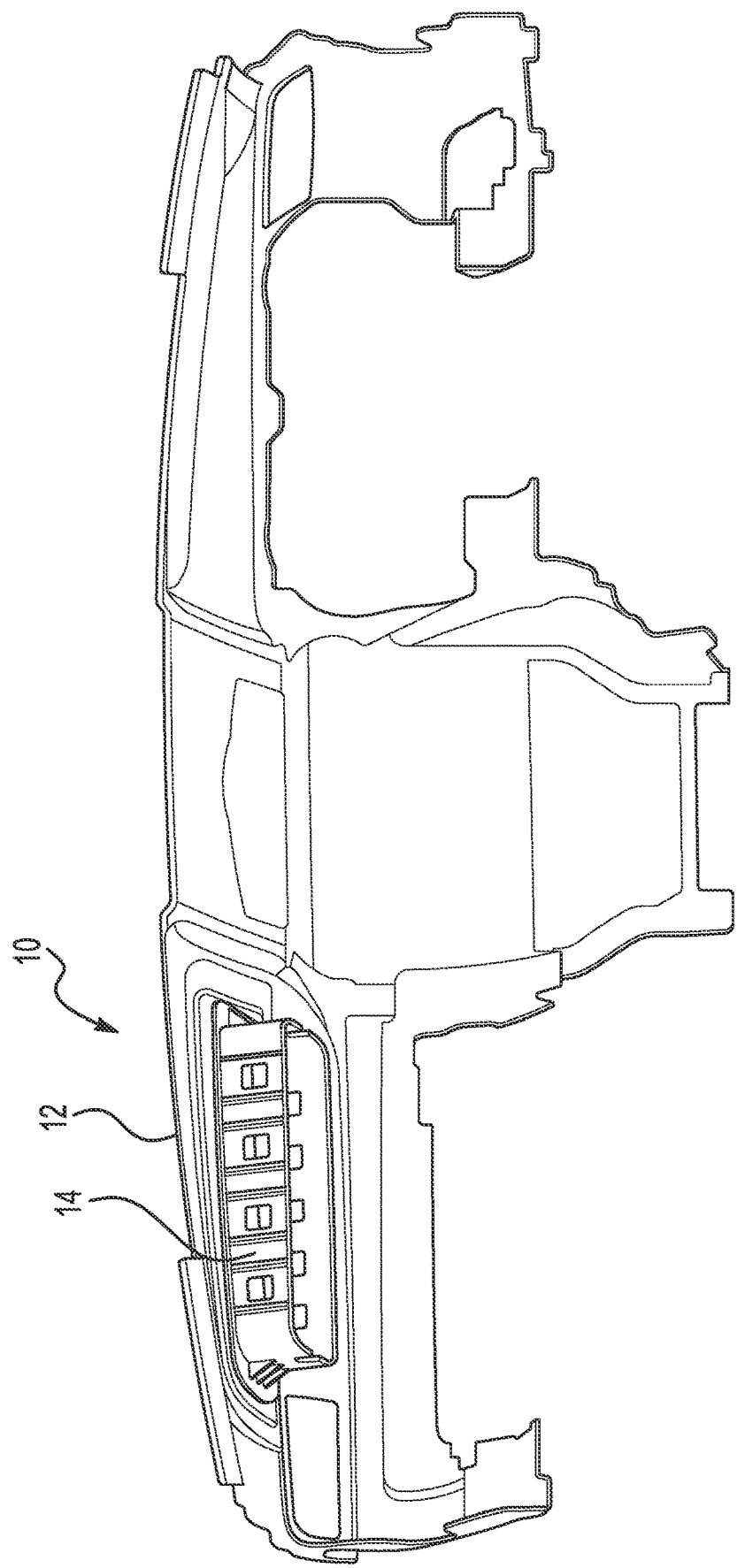
FIG. 16 is a perspective view of yet another illustrative embodiment of a chute panel of an airbag assembly that comprises a full vehicle instrument panel substrate.

Further, it will be appreciated that the present disclosure is not intended to be limited to the formation of a substrate 12 that comprises only a portion of a larger instrument panel substrate of a vehicle. Rather, in some embodiments, the substrate 12 may comprise a full instrument panel substrate (best shown in FIG. 16), or a larger portion of an instrument panel substrate than is shown in the figures and described herein, but that is smaller than the full instrument panel substrate. Accordingly, the present disclosure is not intended to be limited to any particular substrate size.

In any event, following the formation of the substrate 12 (and, in some embodiments, the structures 42) in step 102, the method 100 moves to a step 104 of forming or constructing the chute 14 and chute door 16 of the panel 10. In an embodiment, step 104 may comprise forming the chute 14 and chute door 16 using a known molding process, for example, an injection molding process. More specifically, step 104 may comprise inserting the substrate 12 (and, in an embodiment, the structure(s) 42) formed in step 102 into a molding tool and then introducing an appropriate amount of molding material into the mold tool. The material is then held in the tool for a predetermined amount of time, cooled, and then the resulting chute panel 10 comprising the substrate 12, the chute 14, and the chute door 16 is removed from the mold. While a number of different types of molding materials may be used in step 104 to form the chute 14 and chute door 16, one particularly suitable material that may be used is TPO. It will be appreciated, however, that other types materials suitable to bond with the material used to form the substrate in step 102 may be additionally or alternatively used.

Figure 5:
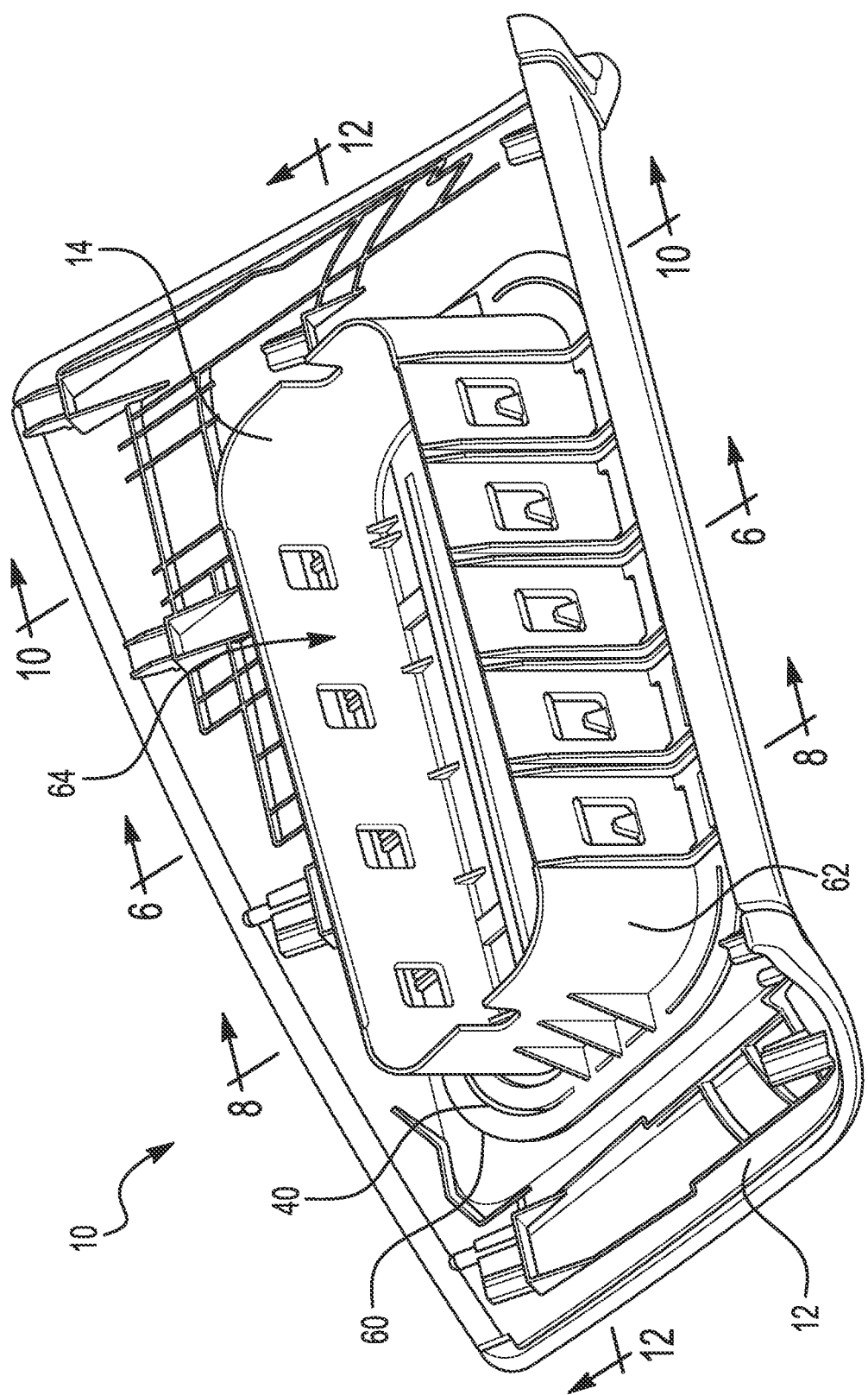
FIG. 5 is another perspective view of the chute panel illustrated in FIG. 2.

The chute 14 formed in step 104 may take a number of forms or designs depending, at least in part, on the mold used in its formation. In the embodiment illustrated in, for example, FIG. 5, the forming step 104 comprises forming the chute 14 to have a portion thereof, which, in embodiment, comprises a base 60 of the chute 14, molded onto and bonded to or with the substrate 12. The forming step 104 may further comprise forming one or more sidewalls 62 extending from the base 60 of the chute in a radial direction relative to the longitudinal axis of the substrate 12 that define(s) a chute interior or internal cavity or void 64 within which an airbag cannister may be housed. Additionally, the chute 14 may be formed such that it is located adjacent to and at least partially surrounds the void 32 in the substrate 12, as illustrated in, for example, FIGS. 4 and 5. As shown in FIGS. 5, 10, and 11, in addition to forming the sidewall(s) of the chute 14, the material introduced into the mold in step 104 at least partially surrounds and bonds to at least portions of the projections 40 of the substrate 12, and bonds to portions of the first surface 28 of the substrate body 20 to form the base 60 of the chute 14 and chemically bond the chute 14 to the substrate 12. In at least some embodiments, the base 60 extends outwardly from the sidewall(s) 62 such that it has the appearance of a flange of the chute 14.

Like the chute 14, the chute door 16 formed in step 104 may take a number of forms or designs depending, at least in part, on the particular mold used in its formation. In the embodiments illustrated in, for example, FIGS. 5-13, the forming step 104 comprises forming the door 16 such that a least a portion of the door is of a unitary construction or integrally formed with the chute 14. More specifically, the material introduced into the mold in step 104 flows into the portion of the mold for forming the sidewalls and base of the chute 14. The material also flows into and fills the void 32 to form the chute door 16 from the material flowed into the void 32. The material in the void 32 may also bond to surfaces of the substrate 12, for example, one or more of the interior surface(s) or wall (s) 34, 35 such that the door 16 is molded to the substrate 12.

In an embodiment wherein the substrate 12 includes one or more door support structures 42, the material may also at least partially surround or encapsulate at least a portion of each of the door support structures 42, and fill in the spaces or gaps between adjacent structures 42 and between the structure(s) 42 and one or more of the interior surface(s) or wall(s) 34, 35 of the substrate body 20 that defines the void 32 such that the void 32 is filled with material. As shown in FIGS. 6-9, in an embodiment, the material flows around at least portions of each of the structure(s) 42 and bonds to one or more of the surface(s) of the body 46 of the structure 42 (e.g., surface 50). In an instance wherein the body 46 includes grooves or channels 52 therein, material introduced in step 104 may also flow into and fill that or those channels 52 to, in at least some embodiments, form a dovetail connection between that or those structures 52 and the material introduced in step 104. In any event, the material that at least partially surrounds or encapsulates at least a portion of each of the structures 42 and also fills the void 32 forms, along with the structure(s) 42, the chute door 16. In an embodiment, an outer surface 66 of the door 16 formed in step 104 is flush with the second surface 30 of the substrate 12, as is shown in FIGS. 2 and 6-11.

Figure 12:
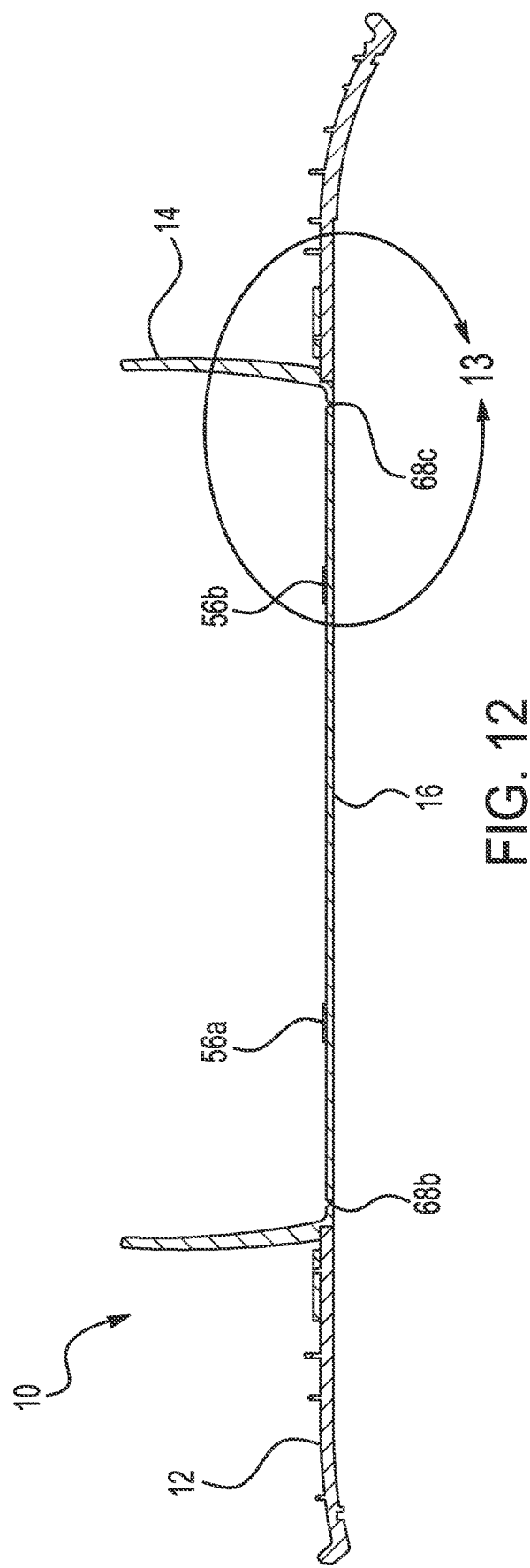
FIG. 12 is another cross-section view of the chute panel illustrated in FIG. 5 taken along the line 12-12 in FIG. 5.
Figure 13:
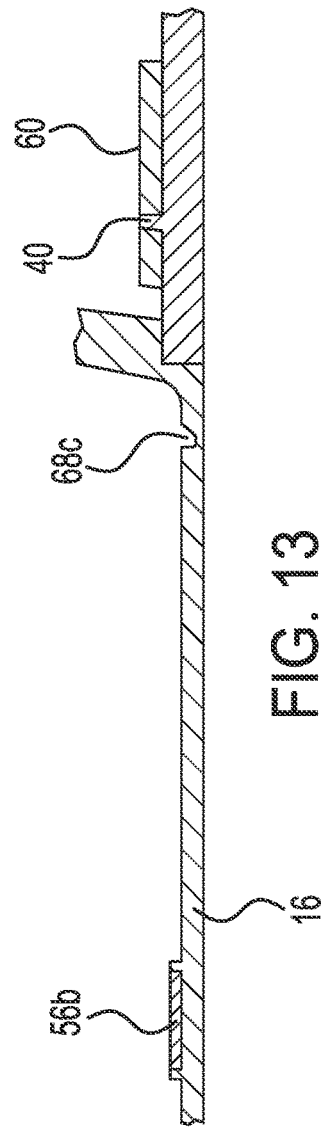
FIG. 13 is an enlarged view of a portion of the cross-sectional view of the chute panel shown in FIG. 12.
Figure 14:
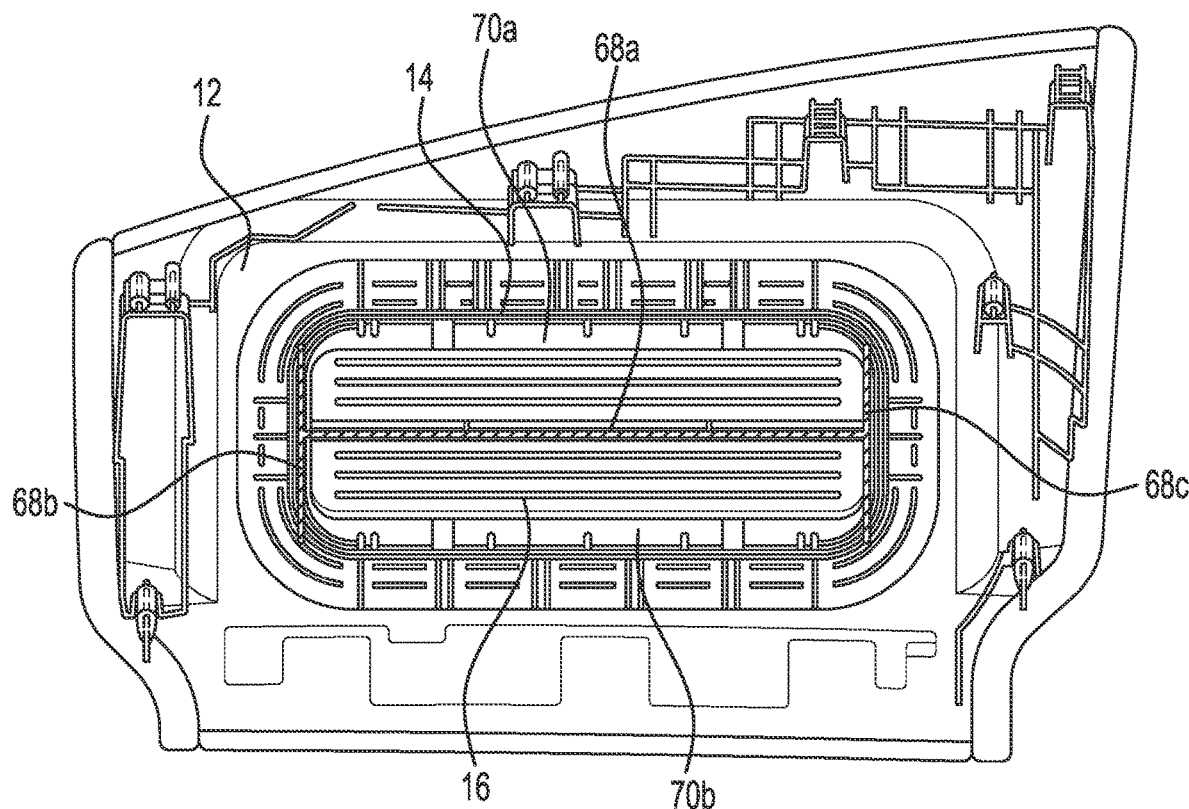
FIG. 14 is a plan view of the illustrative embodiment of the chute panel shown in FIG. 2.

In addition to the above, step 104 may also include forming one or more burst seams 68 in the door 16. The particular number and location(s) of the burst seams will depend, at least in part, on the particular burst seam type or style that is used. Examples of different types of burst seam types or styles are discussed above. By way of example, however, FIG. 14 illustrates an embodiment wherein a two-door style, H-type burst seam is used. In this embodiment, and as shown in FIGS. 6, 7, and 14, a first burst seam 68a is formed that extends along an axis that is substantially parallel to and/or coaxial with the longitudinal axis 26 of the substrate 12. In an embodiment wherein the substrate 10 includes door support structures 42, the first burst seam 68a may extends through the gap 44 between the first and second door support structures 42a, 42b from one end of the chute 14 to the other. As shown in FIGS. 12-14, two additional burst seams 68a, 68b are formed at respective ends of the first burst seam 68a and extend along respective axes that are transverse (e.g., substantially perpendicular) to the axis along which the first burst seam 68a extends (e.g., the axis 26). While one particular burst seam type or style is described above and shown in FIG. 14, it will be appreciated that any number of alternate types or styles may be used instead, including, for example and without limitation, a one door style, U-type burst seam; a three door style, Y-type burst seam; or a four door style, bow tie-type burst seam. Accordingly, it will be appreciated that any suitable type or style of burst seam may be used, and as such, the present disclosure is not intended to be limited to any particular style(s) or type(s).

Regardless of the particular style or type of burst seam that is used, each of the burst seams 68 may be formed as part of the molding process and has a thickness that is less than other portions of the chute door 16, making the seam weaker than other portions of the door such that the seam is configured to break or burst when an airbag in the chute inflates, thereby rupturing the chute door 16 allowing the airbag to burst out toward the passenger cabin of the vehicle.

Step 104 may also include forming one or more hinges 70 between the door 16 and another portion of the chute panel 10, for example, the chute 14 or substrate 12, each having or defining a corresponding hinge axis about which at least a portion of the door may move (e.g., rotate) when the door 16 bursts open. In an embodiment, the hinges 70 are disposed in close proximity to the sidewall(s) 62 of the chute 14 so that the opening created when the door ruptures is sufficiently large to all the airbag bursting therethrough to inflate and expand. As with the burst seams described above, the particular number and location(s) of the hinges 70 will depend, at least in part, on the particular burst seam type or style that is used. Again, examples of different types of burst seam types or styles are discussed above.

By way of example, however, FIG. 14 illustrates an embodiment wherein a H-style burst seam is used. In this embodiment, and as shown in FIGS. 8, 9, and 14, a pair of hinges 70a, 70b are formed that define respective hinge axes that extend substantially parallel to the longitudinal axis 26 of the substrate body 20 from one end of the chute 14 to an opposite end of the chute 14. In this embodiment, the hinges 70a, 70b are disposed on opposing sides of both the chute 14 and the longitudinal axis 26 of the substrate 12, and, in an embodiment, are disposed between the sidewalls 62 of the chute 14 and the door support structure(s) 42 of the substrate 12 and/or chute door 16. More particularly, in an embodiment, the first hinge 70a is formed from and comprises the hinge braces 56a, 56b of the substrate 12 that connect the door support structure 42a to the body 20 of the substrate 12 and the material introduced in step 104 that at least partially surrounds or encapsulates and bonds to the hinge braces 56a, 56b. Similarly, in an embodiment, the second hinge 70b is formed from and comprises the hinge braces 56c, 56d of the substrate 12 that connect the door support structure 42b to the body 20 of the substrate 12 and the material introduced in step 104 that at least partially surrounds or encapsulates and bonds to the hinge braces 56c, 56d. In any event, as with the burst seams described above, each of the hinges is formed as part of the molding process but, in an embodiment, has a thickness that is greater than that of the burst seams.

Following step 104, the method 100 may proceed to one or more additional steps. For example, method 100 may include a step 106 of applying or affixing (e.g., adhering) a foam layer to the second surface of the substrate 12, and/or wrapping the substrate 12 with cover stock (e.g., leather, faux leather, cloth, etc.). Method 100 may additionally or alternatively include a step 108 of inserting an airbag cannister into the chute 14, as is shown in FIG. 3. Method 100 may still further additionally or alternatively include a step 110 of installing or mounting the panel 10 in a vehicle. Accordingly, following the formation of the substrate in step 102 and the chute 14 and chute door 16 in step 104, the method 100 may further include any number of additional steps.

As a result of the methodology described above, an airbag chute panel is produced or manufactured that is generally comprised of a substrate, a chute, and a chute door, wherein the chute and at least a portion of the chute door are integrally formed, and wherein the chute and the chute door are molded to the substrate. Accordingly, another aspect of this disclosure is an airbag chute panel produced or manufactured by the method described herein.

As will be appreciated in view of the description of method 100 set forth above, one example of an airbag chute panel that may be manufactured by method 100 is the airbag chute panel 10 described above and illustrated in for example, FIGS. 2-15. In an embodiment, the chute panel 10 comprises the substrate 12, the chute 14, and the chute door 16.

As described above, the substrate 12 comprises a molded component wherein the body 20 thereof has first and second ends 22, 24 and longitudinal axis 26 extending through and between the first and second ends 22, 24. First and second surfaces 28, 30 of the body 20 face in different radial directions relative to the axis 26 of the substrate body 20 such that, in an embodiment, the first and second surfaces 28, 30 face in opposite directions. In an embodiment, the substrate further includes the void 32 that resides in the substrate body 60 that is configured to be filled in with a material to form at least a portion of a chute door 16. In some embodiments, the substrate 12 may further include one or more chute door support structures 42 that, in an embodiment, are integrally formed with the body 20.

The chute 14 is molded onto at least a portion of the substrate 12 (e.g., the first surface 28 of the substrate body 20). More specifically, the base 60 of the chute 14 is molded and bonded to the first surface 28 of the substrate body 20, and the one or more sidewalls 62 extend radially from the base relative to the axis 26 of the body 20 to define the chute interior or cavity 64 configured to receive and house an airbag cannister. In the embodiment illustrated in, for example, FIGS. 4 and 5, the chute 14 and the base 60 thereof is located adjacent to and at least partially surrounds the void 32 of the substrate 12.

In an embodiment, the chute door 16 is formed, at least in part, within in the void 32 of the substrate 12. More specifically, material with which the void 32 was filled comprises at least a portion of the chute door 16, which, in an embodiment, is flush or coplanar with the second surface 30 of the substrate body 20.

In other embodiments, such as, for example, that shown in FIGS. 6 and 8 wherein the substrate includes one or more door support structures 42, the chute door 16 includes a first portion 72 and a second portion 74. In an embodiment, the first portion 72 comprises the door support structures 42 and the second portion 74 is molded to the first portion (e.g., the door support structures 42) and at least partially surrounds or encapsulates the first portion 72. Further, in an embodiment, the second portion 74, or at least a portion thereof, is integrally formed with the chute 14, and may also be molded to a portion of the substrate 12. As shown in FIGS. 6 and 8, the second portion 74 forms or comprises an outer surface 66 of the door 16 that, in an embodiment, is flush or coplanar with the second surface 30 of the substrate body 20. In other embodiments, neither the first portion 72 nor any other portion of the chute door 16 or chute panel 10 includes the door support structures 42.

Additional aspects of the chute panel 10 may include one or more of those described above with respect to method 100, the description of which will not be repeated but rather is incorporated here by reference.

While a detailed description of one particular embodiment of an airbag chute panel that may be manufactured by method 100 has been provided above, it will be appreciated that the present disclosure is not intended to be limited to solely to such an embodiment. Rather, the method 100 may be used to manufacture embodiments of a chute panel that differ from that described herein.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of manufacturing a chute panel of an airbag assembly, comprising:
   forming a substrate from a first material wherein the substrate includes:
      a body having a first end, a second end, and a longitudinal axis extending between the first and second ends;
      one or more projections projecting radially from the substrate body; and
      a void residing in the body; and
   forming a chute and a chute door from a second material, wherein:
      a portion of the chute is molded onto the body of the substrate; and
      at least one of the one or more projections is at least partially surrounded by and bonded with the portion of the chute molded onto the body of the substrate; and
      forming the chute door comprises filling in the void in the body of the substrate with the second material to form the chute door.

2. The method of claim 1, wherein forming the chute comprises forming a base molded onto the body of the substrate and one or more sidewalls extending from the base in a radial direction relative to the longitudinal axis of the substrate body.

3. The method of claim 1, wherein:
   forming the substrate further comprises forming the substrate to have at least one chute door support structure connected to the body and extending across at least a portion of the void; and
   forming the chute door comprises filling in the void in the body of the substrate with the second material and at least partially encapsulating the at least one chute door support structure of the substrate with the second material to form the chute door.

4. The method of claim 3, wherein the at least one chute door support structure is integrally formed with the body of the substrate.

5. The method of claim 1, wherein the first and second materials are different materials.

6. The method of claim 1, wherein the first and second materials are the same material.

7. The method of claim 1, wherein forming the chute comprises forming a base that is molded onto the body of the substrate and at least one sidewall extending from the base in a radial direction relative to the longitudinal axis of the substrate body, wherein the base of the chute extends away from the void in the substrate and outwardly from the at least one sidewall of the chute.

8. The method of claim 7, wherein the at least one of the one or more projections is at least partially surrounded by and bonded with a portion of the base of the chute.

9. A chute panel for an airbag assembly, comprising:
   a substrate including:
      a body having a first end, a second end opposite the first end, and a longitudinal axis extending therebetween;
      one or more projections projecting radially from the substrate body; and
      a void residing in the body;
   a chute molded onto the substrate and at least partially surrounding the void of the substrate, wherein at least one of the one or more projections is at least partially surrounded by and bonded with a portion of the chute that surrounds the void of the substrate; and
   a chute door formed in the void of the substrate.

10. The chute panel of claim 9, wherein the substrate includes at least one chute door support structure connected to the body of the substrate and extending across at least a portion of the void of the substrate.

11. The chute panel of claim 10, wherein the chute door includes a first portion and a second portion, wherein the first portion comprises the at least one chute door support structure, and the second portion is molded onto the first portion.

12. The chute panel of claim 11, wherein the second portion of the chute door at least partially encapsulates the first portion.

13. The chute panel of claim 9, wherein the chute comprises a base molded onto the substrate and at least partially surrounding the void of the substrate, and at least one sidewall extending from the base in a radial direction relative to the longitudinal axis of the substrate body.

14. The chute panel of claim 13, wherein the at least one of the one or more projections is at least partially surrounded by and bonded with a portion of the base of the chute.

15. The chute panel of claim 13, wherein the base of the chute extends away from the void in the substrate and outwardly from the at least one sidewall of the chute.

16. A chute panel for an airbag assembly, comprising:
   a substrate including:
      a body having a first end, a second end, and a longitudinal axis extending therebetween;
      one or more projections projecting radially from the substrate body;
      a void residing in the body;
      and at least one chute door support structure connected to the body of the substrate and extending across at least a portion of the void of the substrate;
   a chute molded onto the substrate and surrounding the void of the substrate, wherein at least one of the one or more projections of the substrate body is at least partially surrounded by and bonded with a portion of the chute that surrounds the void of the substrate; and a chute door formed in the void of the substrate, wherein the chute door includes a first portion and a second portion, and further wherein the first portion comprises the at least one chute door support structure, and the second portion is molded onto the first portion.

17. The chute panel of claim 16, wherein the second portion of the chute door at least partially encapsulates the first portion.

18. The chute panel of claim 16, wherein the chute comprises a base molded onto the substrate and at least partially surrounding the void of the substrate, and at least one sidewall extending from the base in a radial direction relative to the longitudinal axis of the substrate body.

19. The chute panel of claim 18, wherein the at least one of the one or more projections is at least partially surrounded by and bonded with a portion of the base of the chute.

20. The chute panel of claim 18, wherein the base of the chute extends away from the void in the substrate and outwardly from the at least one sidewall of the chute.

\* \* \* \* \*